United States Patent [19]
Torpey

[11] 3,849,303
[45] Nov. 19, 1974

[54] METHOD AND APPARATUS FOR UPGRADING WASTEWATER TREATMENT PLANTS

[75] Inventor: Wilbur N. Torpey, Douglaston, N.Y.

[73] Assignee: Autotrol Corporation, Milwaukee, Wis.

[22] Filed: Apr. 16, 1973

[21] Appl. No.: 351,179

Related U.S. Application Data

[63] Continuation-in-part of Ser. No. 293,594, Sept. 29, 1972.

[52] U.S. Cl............ 210/4, 210/16, 210/151, 210/195
[51] Int. Cl............ C02c 1/04, C02c 5/10
[58] Field of Search............ 210/3–8, 14, 210/15, 17, 150, 151, 195, 253, 16

[56] References Cited
UNITED STATES PATENTS

| | | | |
|---|---|---|---|
| 2,077,498 | 4/1937 | Streander | 210/253 |
| 3,266,786 | 8/1966 | Grimes et al. | 261/92 |
| 3,335,081 | 8/1967 | El-Naggar | 210/15 |
| 3,547,815 | 12/1970 | McWhirter | 210/7 |
| 3,557,954 | 1/1971 | Welch | 210/17 |
| 3,596,767 | 8/1971 | Antonie | 210/195 X |
| 3,654,147 | 4/1972 | Levin et al. | 210/6 |
| 3,704,783 | 12/1972 | Antonie | 210/17 X |

OTHER PUBLICATIONS

Antonie, Ronald L., "Three-Step Biological Treatment with the Bio-Disc Process," presented at the New York Water Pollution Control Association Meeting, Montauk, New York, June 12–15, 1972.

*Primary Examiner*—Thomas G. Wyse
*Attorney, Agent, or Firm*—Kenneth A. Koch

[57] ABSTRACT

Method and apparatus for increasing the oxidation capacity of carbonaceous and nitrogenous matter in wastewater and providing a denitrification function to existing biological treatment plants, especially activated sludge. A single stage biological treatment unit employing partially submerged rotating biological contactors is used to grow microorganisms that oxidize organic matter, as well as ammonia nitrogen, is provided. The effluent from the single stage unit containing sloughed-off solids and nitrate oxygen, is supplied to a denitrification system which can be an existing aeration and final settling tank which tanks are operated in a manner that denitrifying biological forms develop that utilize the sloughed-off solids from the single stage unit as an energy source and nitrate oxygen for their respiration.

17 Claims, 8 Drawing Figures

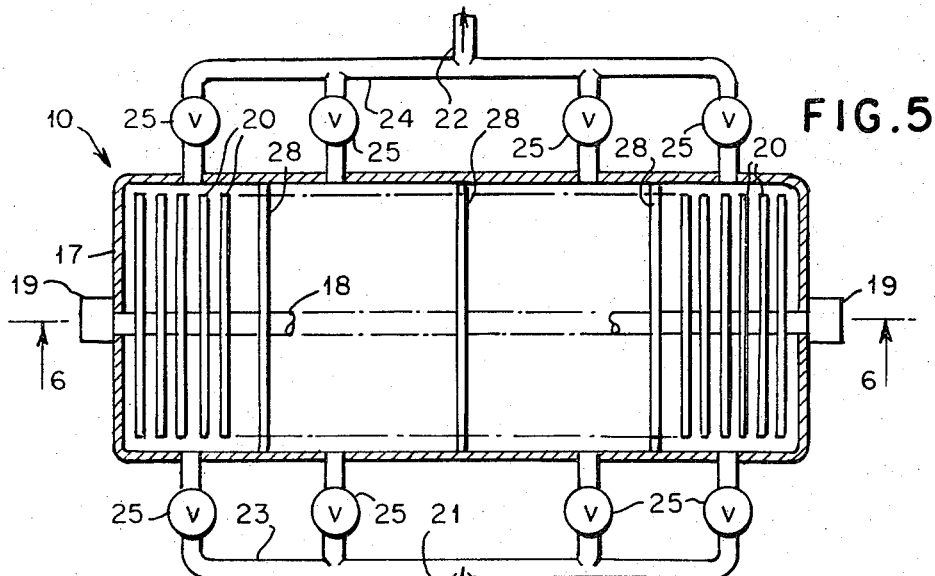
FIG.5
FIG.6
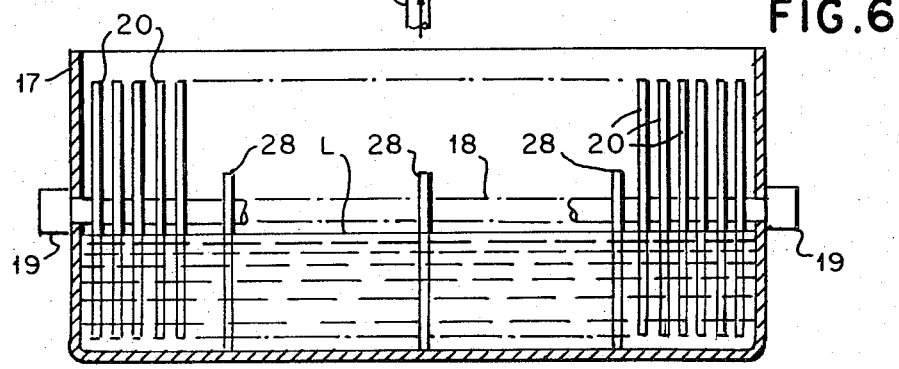
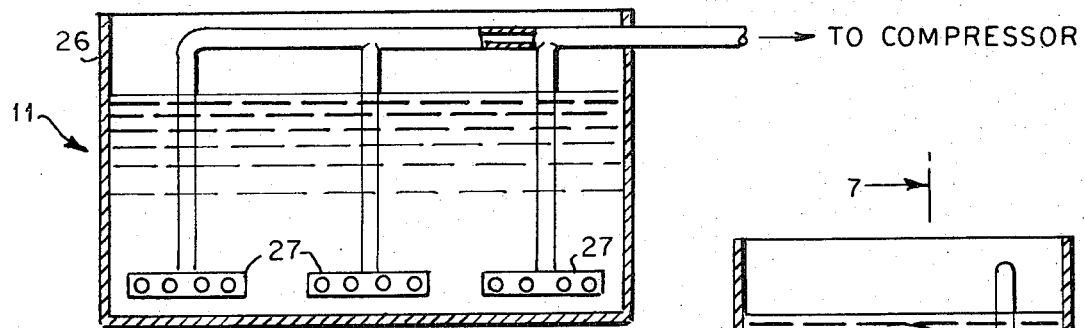
FIG.7
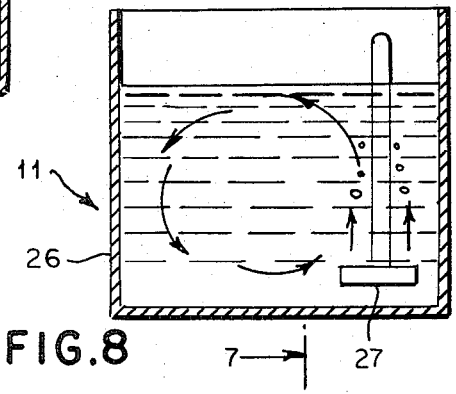
FIG.8

3,849,303

METHOD AND APPARATUS FOR UPGRADING WASTEWATER TREATMENT PLANTS

RELATED APPLICATIONS

This application is a continuation-in part of Ser. No. 293,594 filed Sept. 29, 1972 and entitled TREATMENT OF WASTEWATER by Wilbur N. Torpey, the disclosure of which is hereby incorporated by reference.

BACKGROUND AND PRIOR ART

The invention pertains to the treatment of wastewater to remove and/or biochemically modify carbonaceous and nitrogenous pollutants. More specifically, the invention provides method and apparatus adapted to upgrade existing secondary treatment wastewater plants including the maximum utilization of existing tankage and other related already paid for equipment.

Wastewater treatment plants currently in use typically include primary treatment in the form of sedimentation and screening tanks and devices for removing settleable and floating solids and secondary treatment for the biological removal of carbonaceous matter, usually expressed as $BOD_5$, from the wastewater. Secondary treatment of wastewater is accomplished by providing an environment conducive to the growth of attached biological slimes or suspended flocs which utilize the pollutants in the usually presettled wastewater for their natural growth and maintenance processes. The secondary treatment of wastewater is accomplished by providing means for bringing the wastewater into contact with the slimes or flocs so as to supply nutrients and oxygen to the microorganisms. Such biological slimes or flocs are subsequently separated from the wastewater, thus effecting the necessary clarification. The pre-requisites for the effective bio-extraction of pollutants from wastewater are, therefore, the continuous supply of nutrients necessary for the maintenance and growth of the microorganisms and oxygen adequate for their respiration. Secondary treatment processes currently in widespread use are known as the activated sludge and trickling filtration methods.

The secondary treatment method known as the activated sludge process, along with such variations as the modified aeration and step aeration processes, has gained widespread use over the past several decades. These processes provide for the aeration of the wastewater in the presence of a controlled amount of suspended activated sludge floc. The microorganisms in the biological flocs extract the pollutants from the wastewater for their nutrition and are supplied with oxygen generally in the form of diffused air injected below the surface of the aeration tank. Pollutants are removed from the wastewater by conversion of organic pollutants into biological flocs that are subsequently separated from the wastewater. By a wide margin the vast majority of secondary treatment plants presently in use today are the activated sludge and trickling filtration type.

Although secondary treatment by employing rotating biological contactors to treated wastewater has been shown to be very effective, various technical and economic factors have prevented their widespread utilization. One of the significant factors inhibiting the widespread use of rotating contactor secondary treatment plants, is the tremendous capital investment already committed for activated sludge and trickling filtration plants.

Prior art wastewater treatment systems are primarily concerned with removing carbonaceous pollutants from the wastewater and secondarily with the oxidation or removal of other materials such as nitrogenous compounds, e.g., ammonia and nitrates. Recently, increased attention has been given to the presence of these compounds in receiving waters, when used as a source for potable water supplies.

The nitrogenous matter in normal wastewater typically comprises ammonia, a small concentration of albuminoid compounds, and a large fraction in the form of proteins. The proteinaceous matter in wastewater exists mainly in particulate form and is physically removed, primarily by sedimentation. The ammonia-nitrogen content of normal domestic wastewater is usually from about 15 to 35 mg/liter.

Processes for removing ammonia-nitrogen from wastewater follow two general lines of approach: (1) the physio-chemical, and (2) the biological. Physio-chemical processes generally have the basic disadvantage of being costly, producing undesirable side effects, generating a concentrated brine for disposal, and in some cases, polluting the air with ammonia vapors. The biological processes on the other hand, promote the natural cycling of nitrogen, i.e., oxidation of the ammonia and denitrification of the resulting nitrates to nitrogen gas.

It is a primary objective of the invention to provide a process and related apparatus for the effective removal from wastewater of carbonaceous matter and the nitrification and denitrification of nitrogenous pollutants that are typically present in normal domestic wastewater. The invention provides for the removal of from about 85 to 95 percent of organic matter, measured as $BOD_5$, the biochemical oxidation of ammonia and albumoid nitrogen to nitrite and nitrate-nitrogen and the subsequent denitrification of these oxides to nitrogen gas which is harmlessly evolved to the atmosphere.

A further objective of the invention is to integrate a process of the foregoing type, including the oxidation of organic pollutants and of ammonia-nitrogen as well as the reduction of the oxides of nitrogen so generated, into existing wastewater treatment plants, particularly those utilizing the activated sludge process for secondary treatment, in such a manner as to utilize the available tankage and other capital equipment to a maximum extent. Additional objectives of the invention will become apparent as the description proceeds.

SUMMARY OF THE INVENTION

The foregoing and other objectives of the invention are accomplished by providing a process incorporating a single stage treatment unit for the simultaneous oxidation of carbonaceous and nitrogenous matter typically present in normal domestic wastewater followed by denitrification of the nitrates.

The single stage treatment unit utilizes partially submerged rotating biological contactors in the form of a plurality of closely spaced bodies such as drums, discs, brushes, etc., to grow slimes which utilize the carbonaceous and nitrogenous matter for their metabolism. A preferred form of biological contactor has a honeycomb structure and is disclosed in pending U.S. patent application Ser. No. 252,038 filed May 10, 1972. Pursuant to the invention, the single stage unit is supplied with wastewater either screened or presettled over a range of loading rate based on the surface area of the rotating contactors of between about 0.4 and 1.5 gallons/day/square foot. The partially submerged contactors are forcibly rotated to alternately expose to the atmosphere, the organisms on the contact surfaces for the absorption of oxygen and immersion in the wastewater for the absorption of nutrients. Representative wastewater treatment systems utilizing partially submerged rotating biological contactors for the sequential treatment of wastewater to remove BOD pollutants are described in Torpey U.S. Pat. No. 3,575,849; El Naggar U.S. Pat. No. 3,335,081; Simpson U.S Pat. No. 3,466,241; and Hartmann, et al., U.S. Pat. No. 3,389,798.

Pursuant to the invention, the rate of wastewater applied substantially equally over the surface of the single stage contactor per unit of time is reduced to a range wherein the concentration of carbonaceous matter at the slime-wastewater interface is so low that the fast growing organisms using carbonaceous nutrients as an energy source are relatively starved. When this environment is created, the slow growing organisms, using ammonia for their nutrition, develop and compete successfully with the fast growing organisms using carbonaceous matter. Thus, the faster reaction involving the oxidation of carbonaceous matter is reduced towards the rate of the slower reaction involving the oxidation of nitrogenous matter in a manner that both reactions are forced to proceed simultaneously. Accordingly, by utilizing a single stage of treatment and by control of the rate of feeding of wastewater to the slimes the same surface is used to support both carbon and nitrogen utilizing organisms. This treatment unit is more efficient than a conventional multistaged unit in that it reduces the total requirement for contactor surface by an amount equal to that required for the oxidation of carbonaceous matter.

The oxidation of ammonia-nitrogen is carried out by specific organisms forming attached slimes whose efficiency is rate-limited by their metabolism. That is to say, since the rate of diffusion of ammonia into the slimes is faster than their metabolic rate, the reaction rates are essentially independent of the concentration of ammonia at the slime-wastewater interface. Accordingly, the amount of ammonia oxidized, at a given temperature, depends on the amount of active organisms occupying a given surface over a span of real time, not time spent in the treatment unit. As a result, when the rate of flow of wastewater increases in accord with the diurnal pattern, an increased concentration of ammonia-nitrogen appears in the effluent. To accomplish a high degree of ammonia removal continuously, allowance should be made to provide surface sufficient to treat spans of high flow rate, not average flow rate. Alternatively, a tank can be provided after primary treatment large enough to absorb or dampen the diurnal flow surges and variations in pollutant concentrations entering the plant.

The diameter of the partially submerged rotatable surface is normally in the range of 10 to 12 feet. The slime supporting contactors are rotated so that the peripheral velocity is in the range of about 0.5 to 1.0 ft/sec. and the spacing between adjacent surfaces is in the range of 3/8 to 1 inch. A considerable advantage can be gained by making the single stage unit adaptable to long-term changes in flow rate by dividing the unit into four sections capable of being operated as one, two, three or four sections, as needed, all fed in parallel.

Pursuant to a further aspect of the invention, the aforementioned single stage treatment unit is incorporated into existing wastewater treatment plants preferably those using activated sludge treatment and a denitrification function is provided while utilizing already existing tankage to a maximum degree. In this regard, the aerator and final settling tank of an activated sludge plant is adapted and modified to function as a denitrification unit.

The new single stage treatment unit is interposed between the existing primary treatment unit and the aerator to oxidize both the carbonaceous and nitrogenous matter in the wastewater. Presettled wastewater is supplied to the single stage treatment unit wherein organic pollutants and ammonia-nitrogen are biochemically oxidized. The nitrate containing effluent along with sloughed-off solids is then fed to the adapted aeration tank that is used in conjunction with the final settling tank to reduce the nitrate nitrogen to nitrogen gas by growing denitrifying microorganisms. Solids from the final settling tank are recycled so that a solids concentration in the aerator is reached wherein substantially all the nitrate oxygen is utilized for biological respiration. Sufficient air may be supplied to the aerator only to effect suspension of the solids thus forcing the organisms to use nitrate oxygen for respiration and the consequent reduction of nitrate nitrogen to molecular nitrogen. Other means for effecting mixing and solids suspension in the adapted aeration tank may be employed.

The wastewater supplied to the aeration tank contains mature biological forms that have been sloughed off the contactor surface of the single stage unit as well as the nitrates that were generated. According to the invention, the "dead bodies" of the organisms that participated in the oxidation of the carbonaceous and nitrogenous matter are carried over to the aeration tank and utilized as an energy source by the denitrifying microorganisms thereby eliminating the need for adding an organic carbon source, such as methanol, to the denitrifying unit as is usually necessary in prior art denitrifying methods.

BRIEF DESCRIPTION OF THE DRAWINGS

The invention and its various aspects will be further explained with reference to the drawing in which:

FIG. 5 is a plan view showing the single stage treatment unit of the invention;

FIG. 6 is a cross-sectional elevational view of the single stage treatment unit taken along line 6–6 of FIG. 5;

FIG. 7 is a cross-sectional side elevational view of a denitrification unit according to the invention taken along line 7–7 of FIG. 8.

FIG. 8 is a cross-sectional elevation of the denitrification unit of the invention.

DESCRIPTION OF PREFERRED EMBODIMENTS

Figure 1:
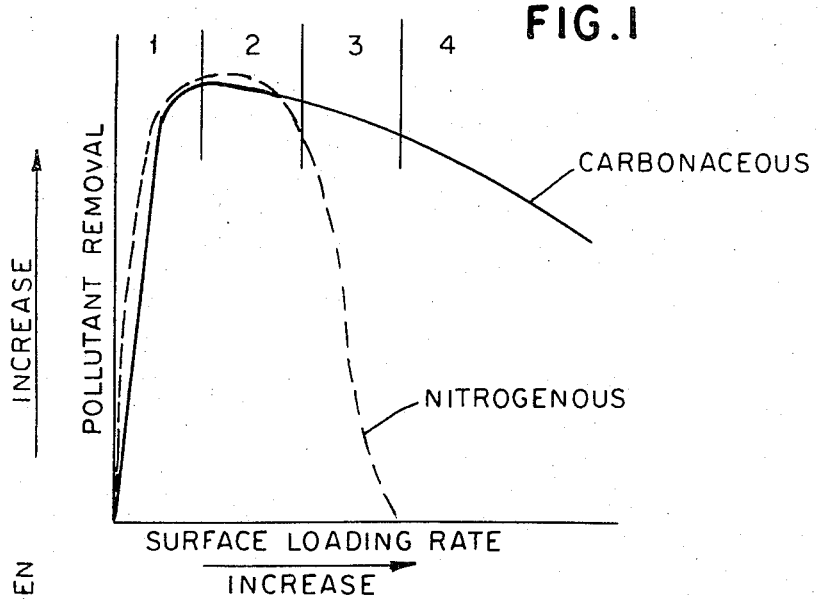
FIG. 1 is a pair of curves showing the effect of contactor surface loading rate on pollutant removal.

Referring to FIG. 1, the relationship of contactor surface loading rate to the removal or oxidation of both carbonaceous and nitrogenous pollutants is shown in terms of four basic zones of biological activity.

Zone 1 embraces a transitory range of loading rate wherein varying degrees of starvation have been induced for both the organisms using carbonaceous and those using nitrogenous matter.

Zone 2 defines a range of loading rates, wherein a preferred degree of starvation for organisms using carbonaceous matter has been induced, while the activity of organisms using nitrogenous matter is relatively unrestricted. The loading rates defined by Zone 2 is from about 0.4 to about 1.5 gallons per day per square foot of contactor surface.

Zone 3 represents a range of loading rates, wherein increases cause organisms using carbonaceous matter to increasingly dominate the environment, resulting in a rapid decrease in the rate of oxidation of nitrogenous matter.

Zone 4 defines a range of loading rates at which the concentration of carbonaceous matter at the biological slime-wastewater interface is sufficiently high to cause the organisms therein using carbonaceous matter to completely dominate the environment, thereby preventing the growth of nitrifying organisms.

Figure 2:
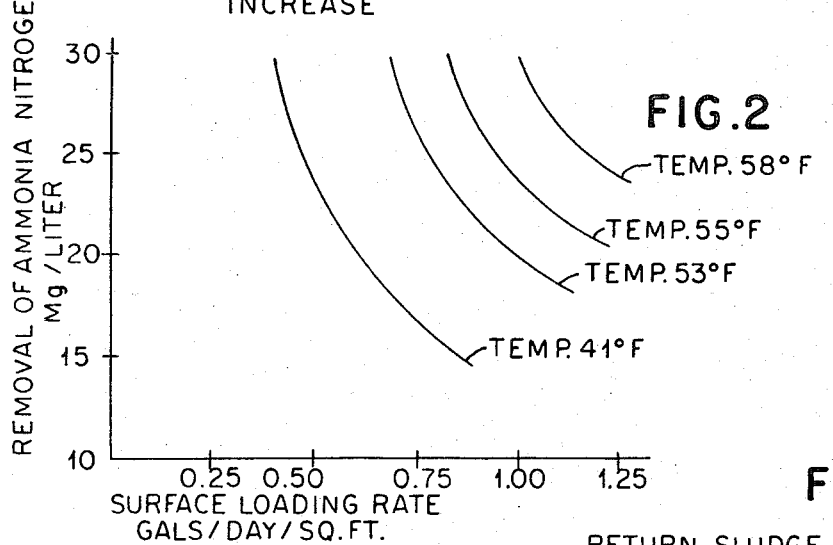
FIG. 2 is a series of curves showing the relationship of contactor surface loading rate to the mg/l of ammonia-nitrogen removed from wastewater at various temperatures.

Referring now to FIG. 2, the relationship of ammonia-nitrogen oxidation through oxidation to contactor surface loading rate for various wastewater temperatures is shown.

The temperature shown in FIG. 2 embrace the lower values of the range of wastewater temperatures encountered in most treatment plants. Because a treatment plant should be designed to treat the coldest wastewater encountered, a selection of loading rate to conform to such minimum temperature should be made. For example, if it were desired to remove about 25 mg/l of the ammonia-nitrogen from normal domestic wastewater using a single stage of treatment, the surface loading rate should be about 0.52 gal/day/sq.ft, if the minimum wastewater temperature expected was 41°F. At a minimum wastewater temperature of 58°F., the comparable loading rate should be about 1.25 gal/day/sq.ft.

As shown in FIG. 2, the slime growing surface requirement to remove 90 percent of the carbonaceous and nitrogenous matter for a typical plant processing 1 million gal/day of normal wastewater having 25 mg/liter of ammonia at a temperature of 55°F. would be 1 gal/day/sq.ft or 1 million sq.ft. A conventional prior art treatment process would require about 1,400,000 sq.ft of surface for equivalent pollutant removal. Further, by use of the single stage of treatment pursuant to the invention, a significant large fraction of the combined nitrogen in the wastewater undergoing treatment is reduced to nitrogen gas, thus lowering the nitrogen concentration in the effluent without adding to the cost of treatment.

Pursuant to a specific aspect of the invention, a preferred contactor surface loading rate of from about 0.4 to about 1.5 gal/day/sq.ft is defined; which rate results in the removal or oxidation of the bulk of carbonaceous and nitrogenous matter from the influent wastewater. The contactor surface loading rate is a function of the temperature of the wastewater being treated as shown in FIG. 2. In some cases, it might be desirable to operate with a contactor surface loading rate high as 2.0 gal/day/sq.ft if, for instance, the lowest anticipated wastewater temperature was above about 60°F. or if it was desired to remove a lesser amount of ammonia from the influent or if the wastewater concentration of nitrogenous matter is dilute. In further accordance with this specific aspect of the invention, contactor surface loading rates of 2 gal/day/sq.ft, or even higher, can be used by increasing the oxygen content of the atmosphere above the wastewater surface in the single stage treatment unit. The atmosphere over the rotating contactors can be enclosed, substantially completely sealed, and enriched with oxygen to the extent that the resulting atmosphere contains up to about 60 percent by volume of oxygen, resulting in an increase in the efficiency of the oxidation of the carbonaceous and nitrogenous material in the wastewater. A contactor surface loading rate from about 1 to about 2.5 gal/day/sq.ft can be utilized when the atmosphere above the rotating contactors contains from about 30 to about 60 percent by volume of oxygen.

Figure 3:
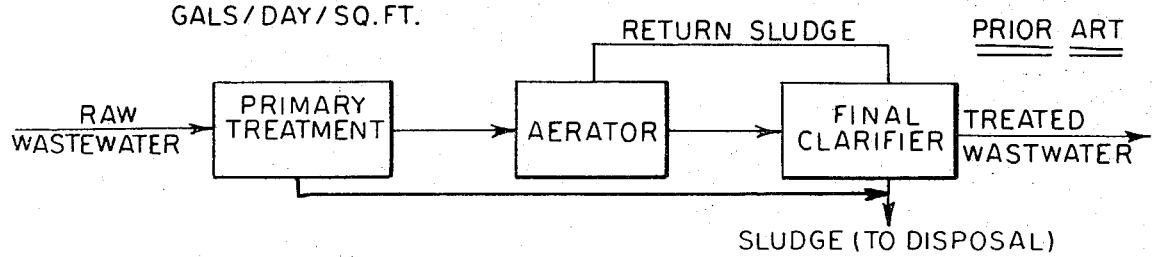
FIG. 3 is a schematic flow diagram of an activated sludge treatment plant of the type commonly in use.
Figure 4:
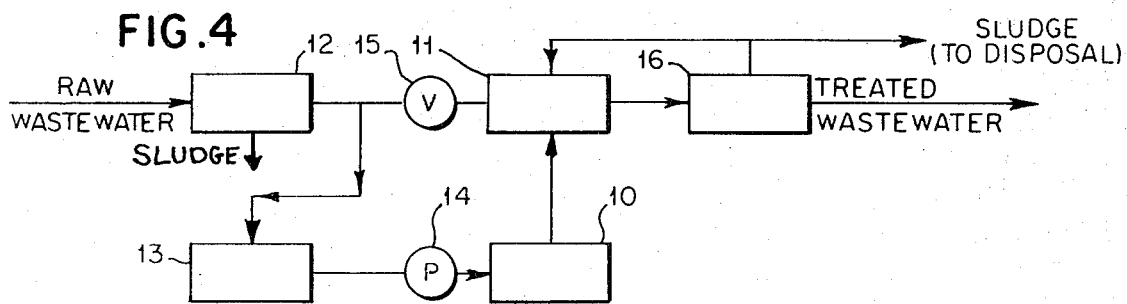
FIG. 4 is a schematic flow diagram of a process according to the invention.

FIG. 3 schematically illustrates an activated sludge wastewater treatment plant. The plant shown in FIG. 3 includes primary treatment in the form of a settling tank to remove settleable and floatable solids or a fine screening device, an aerator for the growth of organisms utilizing carbonaceous matter, a final clarifier for removing sludge and means for recirculating activated sludge to the aerator. The aerator consists of a tank of substantial volume having aeration means, such as plurality of air duffusers, located in the bottom portion of the tank for diffusing air through the wastewater. A major portion of the settled sludge from the final settling tank is continuously returned to the aeration tank while a smaller portion representing the excess sludge is conducted to disposal. According to the specific aspect of the invention shown in FIG. 4 of the drawing, a typical activated sludge treatment plant is adapted to utilize the single stage biological treatment unit 10 of the invention and to provide a denitrification function in the aeration tank 11. The single stage unit employs rotating partially submerged biological contactors for the simultaneous biochemical oxidation of carbonaceous matter and of ammonia-nitrogen.

Effluent from the primary treatment unit 12 is supplied to the single stage unit 10 through a flow equalization tank 13, which is normally present although optional, to absorb diurnal fluctuations in the pollutant concentrations and the rate of raw wastewater flow to the plant.

In operation, it should be realized that wastewater treatment plants are subject to diurnal variation in flow. For example, during the early morning hours, from about 2 to 6 a.m., the flow of raw wastewater entering the plant usually is a small fraction of that during daytime periods. A rate controller or pump 14 is provided to supply a substantially constant flow of wastewater from tank 13 to treatment unit 10 at a rate defined by the range of loading values (gallons/day/square foot) defined by the invention. Valve 15 or other appropriate means is provided to direct the primary treatment effluent to holding tank 13.

Effluent from the single stage treatment unit 10 is supplied to the aeration tank converted to use for performing a denitrification function, i.e., to reduce nitrate-nitrogen to nitrogen gas. This denitrification unit 11 employs suspended biological denitrifying cultures that utilize for their energy source "dead bodies" of the sloughed-off biological forms grown in unit 10 and nitrate oxygen generated in unit 10 for their respiration. The suspended denitrifying cultures in unit 11 are kept in suspension by use of rates of diffused air so low that they will only prevent settling of the sludge in the aerator or by the installation of mechanical mixers to prevent settling of the sludge solids. Treated wastewater from tank 11 is supplied to a final clarification unit 16 from which sludge, which comprises primarily mature biological forms from denitrification unit 11, is withdrawn. Organic or inorganic coagulants might have to be added to the final clarifier to insure that the highly oxidized flocs settle out. The sludge separated from the treated wastewater is returned to the denitrifying unit and a portion of that return flow is wasted to sludge disposal facilities. The ratio of returned sludge to waste sludge should be controlled so that the nitrate concentration in the effluent treated wastewater from final clarifier 16 is preferably in the range of 1 to 5 mg/l for control purposes. According to the invention, the ratio of returned sludge to wastew sludge is increased until the effluent nitrate concentration of unit 16 is less than 5 parts per million. Typically, suitable sludge volume rations (returned:waste) lie between about 3:1 and 15:1, preferably from 5:1 to 12:1.

The single stage biological treatment unit 19 is shown in further detail in FIGS. 5 and 6. Unit 19 includes a tank 17 of the same general configuration as the rotating surfaces below the longitudinally extending rotatable shaft 18. The rotatable shaft 18 is supported by appropriate bearings 19, and is rotated by an appropriate drive mechanism (not shown). A plurality of biological contactors 20 are mounted on shaft 18 transverse to its axis and spaced along its length. The contactors 20 are typically from about 10 to about 12 feet in diameter; mounted on the shafts so that a clear spacing of ⅜ to 1 inch is provided and the contactors extend into the wastewater contained by tank 17 from about ⅓ to ⅔ of their diameter. The contactors are rotated at a peripheral velocity of about 0.25 to about 1 foot per second to alternately supply the organisms growthing thereon with oxygen and nutrients.

Wastewater is supplied to tank 17 by pipe 21 and the treated effluent leaves through discharge pipe 22. Preferably, both the supply pipe 21 and discharge pipe 22 communicate with inlet and outlet manifold units 23 and 24, respectively. The valves 25 on manifolds 23 and 24 are provided to separate tank 17 into 4 sections by intermediate walls 28 so that the tank can be operated in one, two, three or four parts as needed. The manifold units 23 and 24 serve to distribute the wastewater along the length of the treatment unit, which, in addition to mixing within the tank accomplished by moving surfaces, serves to feed all the slime surfaces substantially equally. The level of wastewater L in tank 17 is preferably below the shaft 18, during operation.

The following example further illustrates the operation of the single stage biological treatment unit 10. (Table I appears on the next page)

Table I shows the results of processing settled wastewater in a single stage biological treatment unit. The unit used was a half formed cylindrical tank with a radius of 5 feet 2 inches containing 5,250 sq. ft of contactor surface. The contactors were in the form of thin discs, having a 10 foot diameter and spaced 0.8 inches apart. The discs were immersed in the wastewater 40 percent of their vertical diameter and were rotated at 1 R.P.M.

The data of Table I indicates that when operating a single stage rotating disc biological treatment unit with a loading rate of from 0.9 to 1.3 gal/day/sq.ft of settled wastewater on the contactor surfaces, about 90 percent of the $BOD_5$ remaining after presettling was removed along with the simultaneous reduction of ammonia-nitrogen concentration from 30 to 16 mg/liter at 41°F. and from 30 to 2 mg/liter at 58°F. The same slimes were thus shown capable of oxidizing the carbonaceous and nitrogenous matter.

Additional important advantages are derived from the use of a single stage rotating contactor biological treatment process having a loading rate controlled within the range defined by the invention. The slimes that develop on the contactor surfaces remain thin, that is below ⅛ inch and usually below 1/16 inch thickness, which permits reduction of the spacing between adjacent contactors from a typical ¾ inch to as low as ⅜ inch without undue loss of detention time necessary to remove about 90 percent of the carbonaceous matter measured in terms of $BOD_5$.

TABLE I

| | | | INFLUENT** | | EFFLUENT | | | |
|---|---|---|---|---|---|---|---|---|
| Flow Rate Gals/Day | Temp. °F. | Disc Loading Rate Gals/Sq.Ft./Day | $B.O.D._5$* Mg/l | $NH_3 - N$ Mg/l | $B.O.D._5$* Mg/l | $Na_3 - N$ Mg/l | $NO_3 - N$ Mg/l | Loss of N Mg/l |
| 4,500 | 41 | 0.9 | 125 | 30 | 21 | 16 | 4 | 10 |
| 6,800 | 42 | 1.3 | 131 | 25 | 15 | 13 | 6 | 6 |
| 5,900 | 46 | 1.1 | 129 | 25 | 14 | 13 | 8 | 5 |
| 6,000 | 53 | 1.1 | 121 | 28 | 12 | 9 | 13 | 6 |
| 5,600 | 58 | 1.1 | 109 | 30 | 15 | 2 | 17 | 11 |

* Biological oxygen demand. $B.O.D._5$ is a measure of the concentration of biodegradable organic carbon in a medium obtained by determining the amount of oxygen consumed (mg/l) by the medium at 68°F. in five days.
** Influent — presettled wastewater.

Further, in accordance with the invention, the peripheral velocity of the rotating contactors can be reduced from 1 ft/sec. toward 0.3 ft/sec. as the loading rate is decreased from 1.5 toward 0.4 gal/day/sq.ft, without lowering the dissolved oxygen in the wastewater below about 20 percent of saturation. Such controlled decreases of the rotational velocity of the contactors provides a significant economic benefit by reducing the energy necessary to rotate the contactors, which varies directly as the third to fourth power of the rotational velocity. The invention further provides that when the contactor peripheral velocity is controlled between 0.3 to 1.0 ft/sec. as contactor loading rate is varied within the preferred range of 0.4 to 1.5 gal/day/sq.ft, denitrification can be forced as the organisms in the slimes use nitrate oxygen for their respiration. If the peripheral velocity of the contactors is too slow for the particular unit area loading rate of the wastewater on the rotating surface, anaerobic conditions will develop. On the other hand, if the peripheral velocity of the rotating surfaces is too high, the conversion of nitrates to nitrogen gas will be reduced.

The new single stage treatment unit will reduce the $BOD_5$ in normal domestic wastewater from about 200 to 10 mg/liter and will oxidize ammonia-nitrogen to nitrates according to surface loading rate. In further accordance with the invention, nitrates produced in the single stage unit 10 are reduced to nitrogen gas in the denitrification unit 11.

Referring to FIGS. 7 and 8 of the drawing, a denitrification unit 11 is shown in further detail. The unit 11, which in a preferred form of the invention can be the aeration tank of an activated sludge treatment process, includes a tank 26 having a plurality of air diffusers 27 disposed along one side near the bottom. The air diffusers 26 emit air into the bottom of the tank which bubbles through the wastewater creating wastewater currents as indicated by the arrows in FIG. 8. These induced currents create what is known in the art as "spiral flow." The rate of air supplied to the diffusers 27 should be not more than is necessary to maintain the culture in suspension and in contact with the nitrates in the fluid. Alternately, mechanical mixers can be used to prevent the culture from settling in the denitrification unit.

Effluent wastewater from the single stage biological treatment unit 10, containing mature organisms that have sloughed off the biological contactors and nitrate compounds from the oxidation of ammonia, is supplied to denitrification unit 11.

The mature microorganisms introduced into denitrification unit 11 provide and energy source for the denitrifying organisms that are suspended and circulated in the wastewater while the nitrates present provide oxygen for the respiration of the denitrifying organisms. The denitrifying organisms reduce nitrate-nitrogen to nitrogen gas which is harmlessly evolved to the atmosphere. Wastewater and denitrifying organisms leave denitrifying unit 11 and are supplied to the final clarification unit which removes suspended solids and forms the return sludge. The sludge removed from the final clarifier is recycled through conduit 30 (see FIG. 4), while a small fraction of that return sludge is conducted to the sludge disposal facilities.

In further accordance with the invention, other existing wastewater plants that include secondary treatment facilities can be adapted to include a denitrification function as well as to effect satisfactory BOD removal. For example, the biological treatment tank of a trickling filtration plan can be used to growth suspended denitrifying biological forms in a similar manner to the aeration tank of an activated sludge facility. The media used to grow slimes living on organic carbon are removed from the trickling filtration tank, the bottom outlets sealed, appropriate effluent weir, collection troughs and conduit means provided to conduct the flow to the final clarifier, and means for mixing the wastewater, such as a mechanical stirrer, to keep the denitrifying organisms in suspension and in contact with the nitrates should be provided. Recirculating means for returning sludge to the trickling filtration tank converted to a denitrifying tank from the final clarifier should also be provided.

In view of the foregoing description, it is seen that the invention provides a biological treatment unit of increased efficiency that simultaneously oxidizes carbonaceous pollutants and oxidizes ammonia-nitrogen to nitrates. The new single stage biological treatment unit can be incorporated into existing wastewater treatment plants in combination with a denitrifying function to remove nitrogen from the wastewater while utilizing to the maximum extent the existing and paid for tankage and other capital equipment. According to the invention, an activated sludge treatment plant which typically removes about 90 percent $BOD_5$ and oxidizes a very small portion, if any, of the ammonia to nitrate form can be upgraded to remove up to 95 percent of the $BOD_5$ and produce a final effluent containing less than 5 parts per million of nitrates and virtually no ammonia-nitrogen.

I claim:

1. Process for the treatment of wastewater including carbonaceous and nitrogenous pollutants comprising the steps of,
   a. removing settleable and floatable solids to obtain presettled wastewater;
   b. supplying said presettled wastewater at a predetermined rate to a biological treatment unit;
   c. said biological treatment unit employing partially submerged rotatable biological contactors having surface area for the growth and maintenance of organisms;
   d. rotating said biological contactors at a predetermined peripheral velocity to alternately expose said surface area to wastewater and an oxygen containing atmosphere;
   e. said predetermined rate and peripheral velocity being chosen to biochemically oxidize said carbonaceous and nitrogenous pollutants in said biological treatment unit;
   f. supplying wastewater including mature organisms from said biological treatment unit to a denitrifying unit;
   g. said denitrifying unit employing denitrifying organisms suspended in the wastewater to convert the nitrogen content of a substantial portion of said oxidized nitrogenous pollutants to nitrogen gas without the need for the addition of an external carbonaceous energy source;
   h. creating currents in said wastewater in said denitrifying unit to maintain said denitrifying organisms in suspension;
   i. supplying said wastewater from said denitrifying unit to a final clarifier;
   j. said final clarifier removing sludge which includes mature organisms;
   k. recirculating a portion of said removed sludge to said denitrification unit without said recirculated sludge passing through said biological treatment unit and;
   l. wasting a portion of said removed sludge.

2. The method according to claim 1, wherein said currents are created by the introduction of air into said denitrification unit.

3. Method according to claim 1, wherein said predetermined rate is from 0.4 to 2.5 gallons/day/square foot of said surface area.

4. A wastewater treatment plant comprising
 a. a primary treatment means for removing settleable and floatable solids from said wastewater;
 b. a biological treatment unit including a tank having a plurality of rotatable biological contactors mounted on a rotatable shaft disposed therein;
 c. first conduit means for supplying wastewater from said primary treatment means to said biological treatment unit;
 d. a denitrification unit;
 e. second conduit means for supplying wastewater from said biologcal treatment unit to said denitrification unit;
 f. said denitrification unit including circulating means for creating currents in said wastewater adequate to maintain cultures of growing organisms in suspension in said wastewater;
 g. final clarification means for receiving wastewater from said denitrification unit and removing biological forms and microorganisms in the form of sludge, and,
 h. third conduit means for recirculating a portion of said sludge from said final clarification means to said denitrification unit without said recirculated sludge passing through said biological treatment unit.

5. Treatment plant according to claim 4 further including flow control means for providing a constant rate of flow to said biological treatment unit.

6. Treatment plant according to claim 5, wherein said flow control means includes a holding tank upstream from said biological treatment unit to absorb diurnal variations in the rate of wastewater flow to said primary treatment unit.

7. The method according to claim 1 wherein said predetermined peripheral velocity is from 0.25 to 1.0 ft/sec.

8. The method according to claim 1 wherein from 85 to 95 percent of $BOD_5$ is removed from said wastewater and a substantial portion of said nitrogenous pollutants are oxidized in said biological treatment unit.

9. The method according to claim 3 wherein said predetermined rate is from 0.4 to 1.5 gallons/day/square foot of said surface area.

10. The method according to claim 1 wherein the volume ratio of recirculated sludge to wasted sludge is increased until the concentration of oxidized nitrogenous pollutants in the wastewater effluent from said final clarification means is less than about 5 parts per million.

11. The method according to claim 1 wherein the volume ratio of recirculated sludge to wasted sludge is from 3:1 to 15:1.

12. Apparatus according to claim 4 wherein said circulating means includes at least one air diffuser disposed in the lower portion of said denitrification unit.

13. A method for substantially upgrading the pollutant removal capability of wastewater treatment plants that include a primary treatment means for the removal of settleable and floatable solids from said wastewater, an activated sludge processing tank and a final clarifier, said method including the steps of providing a biological treatment unit including a plurality of partially submerged rotatable biological contactors having surface area for the growth and maintenance of organisms between said primary treatment means and said processing tank, supplying wastewater including carbonaceous and nitrogenous pollutants from said primary treatment means to said biological treatment unit at a predetermined rate, rotating said contactors at a predetermined peripheral velocity to alternately expose said surface area to wastewater an an oxygen containing atmosphere, said predetermined rate and peripheral velocity being chose to biochemically oxidize carbonaceous and nitrogenous pollutants in said biological treatment unit, supplying the effluent from said biological treatment unit, including mature organisms sloughed off from the surface area of said contactors and oxidized nitrogenous pollutants to said processing tank, operating said processing tank to grow denitrifying organisms suspended in said wastewater, said denitrifying organisms utilizing oxygen from said oxidized nitrogenous pollutants for respiration and sloughed off mature organisms as an energy source to convert the nitrogen content of a substantial portion of said oxidized nitrogenous pollutants to nitrogen gas, supplying the effluent from said processing tank to said final clarifier, removing solids in the form of sludge from said wastewater in said final clarifier, wasting a first portion of said sludge and recirculating a second portion of said sludge to said processing tank without said recirculated sludge passing through said biological treatment unit, whereby said denitrifying organisms are grown in said processing tank without the addition of an external carbonaceous energy source.

14. The method of claim 13 further including the step of creating currents in said wastewater in said processing tank.

15. The method of claim 13 wherein the volume ratio of recirculated sludge to wasted sludge is increased until the concentration of oxidized nitrogenous pollutants in the wastewater effluent from said final clarification means is less than about 5 parts per million.

16. The method of claim 13 wherein the volume ratio of recirculated sludge to wasted sludge is from 3:1 to 15:1.

17. The method of claim 13 wherein said predetermined rate is from 0.4 to 2.5 gallons/day/per square foot of said surface area and said peripheral velocity is from 0.25 to 1.0 ft/sec.

* * * * *